United States Patent
Vinck

(10) Patent No.: US 7,620,183 B2
(45) Date of Patent: Nov. 17, 2009

(54) METHOD FOR ESTABLISHING A CONNECTION BETWEEN A TERMINAL AND AN OPERATING MOBILE RADIO NETWORK, MOBILE RADIO NETWORK AND TERMINAL USED IN SUCH A METHOD

(75) Inventor: Bart Vinck, München (DE)

(73) Assignee: Siemens Aktiengesellschaft, Munich (DE)

( * ) Notice: Subject to any disclaimer, the term of this patent is extended or adjusted under 35 U.S.C. 154(b) by 1365 days.

(21) Appl. No.: 10/296,318

(22) PCT Filed: Apr. 3, 2001

(86) PCT No.: PCT/DE01/01298

§ 371 (c)(1),
(2), (4) Date: Nov. 22, 2002

(87) PCT Pub. No.: WO01/91494

PCT Pub. Date: Nov. 29, 2001

(65) Prior Publication Data

US 2004/0185829 A1    Sep. 23, 2004

(30) Foreign Application Priority Data

May 22, 2000    (DE)    ................. 100 25 271

(51) Int. Cl.
*H04K 1/00* (2006.01)

(52) U.S. Cl. ................ 380/270; 380/247; 380/248; 726/1; 726/2; 726/14; 455/1; 455/410; 455/411; 455/436; 709/225; 709/230; 709/249; 713/150; 713/168; 713/189

(58) Field of Classification Search ................. 455/410, 455/411, 1, 436; 726/2, 26, 1; 380/270, 380/248, 247; 709/225
See application file for complete search history.

(56) References Cited

U.S. PATENT DOCUMENTS

4,555,805 A    11/1985    Talbot (Continued)

FOREIGN PATENT DOCUMENTS

DE    198 12 215    9/1999

(Continued)

OTHER PUBLICATIONS

3G TS 33. 102 V3.2.0, Technical Specification Group Services and System Aspects, pp. 1, 16-42, 52-65, 1999.*

(Continued)

*Primary Examiner*—Nasser G Moazzami
*Assistant Examiner*—Shanto M Abedin
(74) *Attorney, Agent, or Firm*—King & Spalding L.L.P.

(57) ABSTRACT

According to the inventive method, a message is transmitted from an operating mobile radio network (NW2) to a terminal (MS1*a*) that identifies coding techniques (UEA-NW) supported by the operating mobile radio network in order to establish a connection between the terminal (MS1*a*) that supports a number (UEA-MS) of coding techniques and the operating mobile radio network (NW2). The terminal selects, if available, a coding technique (UEA) that is supported by the terminal and the operating mobile radio network (NW2), and the connection is operated using the coding technique selected by the terminal. If no coding technique is available that is supported by the terminal and the operating mobile radio network, the connection is operated uncoded only upon prior authorization.

20 Claims, 3 Drawing Sheets

U.S. PATENT DOCUMENTS

| | | | |
|---|---|---|---|
| 4,920,567 A | | 4/1990 | Malek |
| 5,371,794 A | | 12/1994 | Diffie et al. |
| 6,137,885 A | * | 10/2000 | Totaro et al. ............... 380/247 |
| 6,249,584 B1 | * | 6/2001 | Hamalainen et al. ........ 380/270 |
| 6,671,507 B1 | * | 12/2003 | Vinck ......................... 455/411 |
| 6,763,112 B1 | * | 7/2004 | Haumont ..................... 380/247 |
| 6,804,506 B1 | * | 10/2004 | Freitag et al. ............... 455/411 |
| 6,957,061 B1 | * | 10/2005 | Wright ........................ 455/411 |
| 7,131,006 B1 | * | 10/2006 | Carroll ........................ 713/171 |
| 7,149,896 B1 | * | 12/2006 | Bahl et al. ................... 713/166 |
| 2001/0006552 A1 | * | 7/2001 | Salokannel ................. 380/272 |

FOREIGN PATENT DOCUMENTS

| | | | |
|---|---|---|---|
| DE | 198 40 742 | | 3/2000 |
| WO | WO 99/25093 | * | 5/1999 |
| WO | WO 99/48318 | * | 9/1999 |
| WO | WO 00/74345 | | 12/2000 |
| WO | WO 00/74345 A1 | * | 12/2000 |

OTHER PUBLICATIONS

ETSI TS 133 102 V3.3.1 (Jan. 2000), Technical Specification, Universal Mobile Telecommunications Systems (UMTS).*

C W Blanchard, Security for the third generation (3G) mobile system, pp. 1-12.*

Gunther Horn et al, An Introduction to the Security Features of 3GPP and Third Generation Mobile Communication Systems, pp. 1-39, VTC 2000 Spring Conference.*

"Universal Mobile Telecommunications System (UMTS; 3G Security Architecture (3G TS 33. 102 version.3.3.1 Release 1999" ETSI Technical Specification, Jan. 2000, pp. 1-60.

* cited by examiner

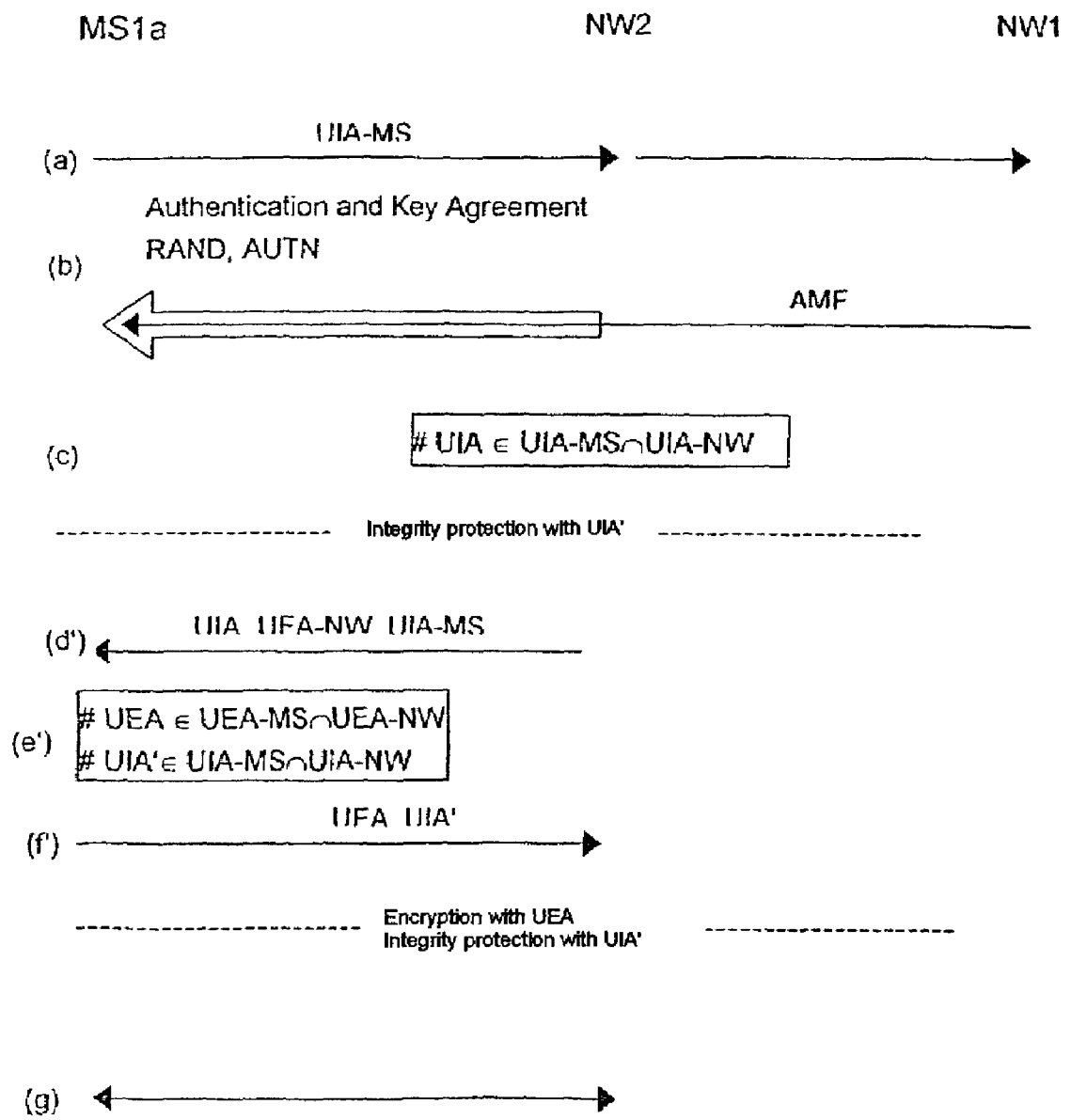

METHOD FOR ESTABLISHING A CONNECTION BETWEEN A TERMINAL AND AN OPERATING MOBILE RADIO NETWORK, MOBILE RADIO NETWORK AND TERMINAL USED IN SUCH A METHOD

CLAIM FOR PRIORITY

This application claims priority to International Application No. PCT/DE01/01298 which was published in the German language on Nov. 29, 2001.

TECHNICAL FIELD OF THE INVENTION

The invention relates to a method for setting up a connection between a terminal and a serving mobile radio network, particularly a packet-type mobile radio network, and a mobile radio network and a terminal.

BACKGROUND OF THE INVENTION

DE 198 12 215 A1 discloses a method for preventing monitoring at the radio interface of a mobile radio network, a mobile station exhibiting an operating mode, which can be switched on by the subscriber, in which a connection is aborted if the received identification permits the connections with unencrypted information.

In unencrypted connections in mobile radio systems and, in particular, in packet-type mobile radio systems such as, for example, GPRS or UMTS-PO, a so-called "hijacking" attacks occur in which an intruder infiltrates his own file or data packets into someone else's connection and thus becomes a parasite on radio resources which are paid by regular users. Possibilities of such attacks exist, for example, when a regular user accesses data services such as, for example, those of an Internet provider or announcement services which frequently charge high tariffs. An attacker who successfully infiltrates such a connection can also access the services and continue the access when the regular user believes that the connection is terminated. The regular user is then charged with the due fees. If the usage fees are not calculated from the duration of a connection but from the number of files transferred, the attacker can mix his file in with a file of the user. Users can be especially susceptible to attacks on on-line payment traffic. An attacker could succeed in triggering disadvantageous payment processes unnoticed by a user. An effective countermeasure against such misuse is the use of encryption techniques.

As a protection, the familiar GSM network provides the terminal and the network with the possibility of setting up an encrypted connection and selecting an encryption technique supported by both ends during the setting up of the connection.

In the familiar GSM network, the terminal informs the base station of the encryption techniques supported by the terminal. The base station then selects one which is supported by the base station itself for preparing an encrypted connection in an early phase of the setting up of the connection even before the authentication (authentication and key agreement between terminal and base station). The designation of this encryption technique is transmitted back to the terminal and the transmission begins by using the encryption mechanism thus specified.

However, this negotiation about an encryption technique is not secure if active attacks on the interface are taken into consideration. The network is not able to check whether the information about the encryption techniques supported by the terminal which is received by it has actually been sent by the terminal and the terminal is also not sure that the network has received the correct information.

This approach normally used in the GSM network is also applied in the UMTS system. In this system, techniques for integrity protection are additionally used which enable a receiver to recognize whether the data received by him actually come from an assumed transmitter or whether they have been corrupted by a third party.

When a connection is set up in the UMTS system, both the encryption and the integrity protection techniques supported by the terminal are statically stored in it and are transmitted to the serving mobile radio network in an early phase of the connection setup. The serving mobile radio network selects an encryption technique and an integrity protection technique which is also supported by itself, starts the integrity protection and sends designations of the selected techniques to the terminal. Together with the selected encryption and integrity protection technique, the network reports the techniques received by it back to the terminal. When it receives this information, the terminal checks the completeness of the received message and compares the encryption and integrity protection techniques transmitted to the network with those reported back from there in order to detect by this means a possible corruption of the messages exchanged. When the terminal has acknowledged the reception, the encryption can begin. If the network does not select an encryption technique but the "unencrypted" mode of operation, the terminal can reject the connection.

Such a procedure is not problematic as long as the terminal is located within the area of its home network because it can be ensured that the terminal and the network have at least one common encryption mode. Hence, cases where a connection intended by the user of the device cannot be encrypted do not occur. It is, therefore, obvious and has already been proposed as a standard to use terminals which reject unencrypted connections right away. If all users are equipped with such terminals, it will scarcely be possible for an intruder to take control of an existing connection and to infiltrate his own data into it in such a manner that they can trigger intended reactions in the network.

A critical disadvantage of this approach is, however, that it raises problems in its application when the serving mobile radio network is not also the home network of the terminal. This is because the use of encryption techniques in mobile radio is not permissible in all countries. Moreover, these techniques are partly subject to export restrictions so that they cannot be used in some countries where they would possibly be permissible in accordance with the national law because the export to these countries is subject to sanctions.

Thus, terminals which only allow encrypted connections could not be used in a large number of countries and would, therefore, be unattractive for the users.

Although it is also conceivable that a terminal offers to the serving network not only the supported encryption techniques but also the option to operate a connection unencrypted during the connection setup. Although this would possibly extend the geographic area where the devices can be used but it would be at the cost of security. This is because in this case the desired protection would no longer be effective since an attacker would have the possibility of pretending to the terminal that he is the base station of the serving network and instruct the terminal to leave the connection unencrypted.

SUMMARY OF THE INVENTION

The invention discloses a method for setting up connections and a terminal and mobile radio network which, on the one hand, provide a high degree of security against "hijacking" attacks but, on the other hand, can also be used in countries in which encryption cannot be used and which, at the same time, are not complicated for the users to use.

In one embodiment, by shifting the responsibility for selecting the encryption method to be used for a connection to the terminal in accordance with the invention, an attacker can no longer influence this selection and, in particular, he cannot produce an unencrypted connection if this has not been expressly authorized. The authorization can be granted by the user of the terminal, for example in advance by operating the terminal in an operating mode in which it also receives unencrypted calls or in the individual case by operating the terminal in an operating mode in which, every time a connection to be set up cannot be encrypted, the terminal requests the authorization for setting up this connection from the user. The authorization can also be granted by the home network of the terminal as will still be explained in greater detail later.

In another embodiment, if the serving mobile radio network provides an integrity protection, for example in the case of an UMTS network, it is desirable, in order to protect against attacks, if the integrity protection is activated before the message about the encryption techniques supported by the serving mobile radio network is transmitted to the terminal. The terminal can thus detect whether the message has been corrupted or comes from an unauthorized source and ignore it, if necessary.

In one aspect, in order to be able to set up an integrity protection, it is desirable if the terminal reports integrity protection techniques supported by it to the serving mobile radio network and the serving mobile radio network selects one among the integrity protection techniques supported by itself and the terminal and transmits a message about the selected integrity protection technique to the terminal. This message can be a part of the message to the terminal which includes the encryption techniques supported by the serving mobile radio network.

In a preferred embodiment of the method, an encryption administration information item which informs the terminal whether unencrypted connections with the serving mobile radio network have been authorized by the home network is transmitted by the home network to the terminal for setting up a connection. As explained above, this authorization may be necessary, e.g. due to the situation of the national law at the location of the serving mobile radio network or export restrictions.

In one aspect, if the serving mobile radio network permits an encrypted connection, encryption should be used. In principle, however, it is not impossible that a connection has to be established unencrypted even if the serving mobile radio network supports encryption, for reasons which are not within the scope of the present invention and have not been mentioned in the description following.

In this embodiment of the method, the readiness of a terminal to accept unencrypted connections is essentially subject to the control of the home network. This makes it possible to ensure the highest degree of transmission security. Negligence by the user cannot lead to connections remaining unencrypted at locations where there is no technical or legal necessity for this.

Transmitting the encryption administration information item from the home network of the terminal ensures that the content of this information is relevant.

The encryption administration information item is transmitted in a simple manner via the serving network.

In one embodiment, during the transmission via the serving network a corruption of the encryption administration information item by the serving network or an encryption administration information item from an attacker which has been corrupted by an attacker can be recognized. For this purpose, it is possible to provide a check of its truth content at the mobile terminal. This check can be performed implicitly by sending the encryption administration information item with its own encryption from the home network or by protecting the information item with an integrity mechanism. If this encryption administration information item is not comprehensible to the serving mobile radio network (encryption) or is protected by a message authentication code (integrity mechanism), the serving mobile radio network is not able to manipulate it but must transmit it transparently and a manipulated base station used for a hijacking attack is also not able to generate an encryption administration information item which is accepted or accepted as genuine by the terminal.

In another embodiment, when the encryption administration information item specifies the necessity or permissibility of an unencrypted connection, the user of the terminal is advantageously given the choice of whether the connection is to be set up unencrypted or the connection attempt is to be aborted. This ensures that, in cases of doubt, the user is aware of the risk of unauthorized access to his connection and possibility of monitoring and can thus decide from individual case to individual case whether this risk is tolerable or whether a more secure type of transmission should be selected.

In one aspect, to keep the terminal as simple to operate as possible, it can also be provided that, if it is necessary, i.e. if the encryption administration information item supplied by the home network specifies that the serving network does not support encryption, an unencrypted connection is established without further check back. In this case, it is appropriate to inform the user that the connection is unencrypted by means of a display on the terminal of the user.

In another aspect, the terminal can be advantageously switched between at least two of three operating modes which correspond to the abovementioned alternative procedures for the case of a lacking encryption capability.

In still another aspect, Less signaling complexity during the setting-up of a connection can be achieved under these circumstances by the terminal reporting integrity protection techniques supported by it to the serving mobile radio network, and the serving mobile radio network selecting one among the integrity protection techniques supported by itself and the terminal and informing the terminal of this, before the encryption administration information item is transmitted or the encryption technique is selected.

In another embodiment of the invention, there is a terminal including, for example, a control unit which selects one among the encryption techniques supported by the terminal and by the serving mobile radio network, and a serving mobile radio network contingent to follow an instruction, as sent by the terminal, to use a selected encryption technique.

BRIEF DESCRIPTION OF THE DRAWINGS

In the text which follows, exemplary embodiments are explained in greater detail with reference to the drawings, in which:

FIG. 3 shows a modification of the signaling sequence shown in FIG. 2.

DETAILED DESCRIPTION OF THE INVENTION

Figure 1:
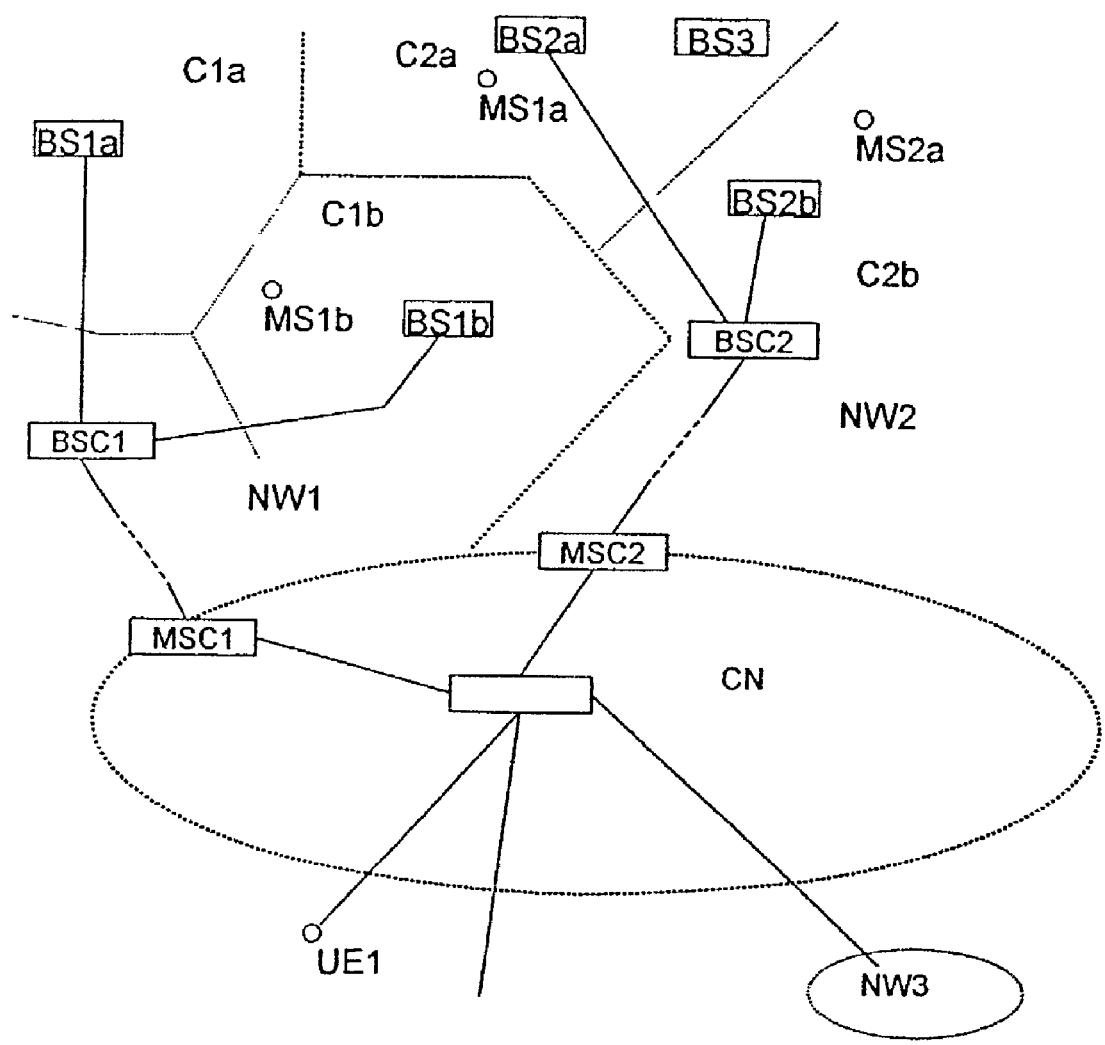
FIG. 1 shows the structure of a mobile radio network in which a terminal is located, the home network of which differs from the mobile radio network.

FIG. 1 illustrates the structure of a mobile radio communications system in which the present invention can be applied. The figure shows two mobile radio networks NW1 and NW2, the designations of the components of the first network in each case including the number 1 and those of the second network containing including the number 2.

Each network NW1, NW2 comprises a full-coverage arrangement of geographic cells C1a, C1b, . . . , C2a, C2b, . . . , which in each case correspond to the range of the radio signal from base stations BS1a, BS1b, . . . , BS2a, BS2b, . . . which communicate with mobile terminals staying in the respective cells. These networks NW1, NW2 can be, e.g. UMTS mobile radio networks.

In each case, a number of base stations BS1a, BS1b, . . . and BS2a, BS2b, . . . are allocated to one base station controller BSC1, BSC2 and the base station controllers BSC1, BSC2 are in each case connected to a mobile switching center MSC1, MSC2 via intermediate stages, not shown. The mobile switching centers switch connections between mobile terminals when both are located in cells which are in each case allocated to the same mobile switching center.

Each mobile terminal is allocated to a so-called home network which is normally the mobile radio network of an operator with whom the user of the terminal has concluded a usage contract. So-called roaming agreements between the network operators enable the users to operate their terminals also in other mobile radio networks and the home network. A mobile radio network via which a mobile terminal is handling its communication at a given time is called the serving network; it can differ from the home network.

To explain the present invention, in particular, a mobile terminal MS1a is considered which, as can be seen from its number 1, has the first mobile radio network NW1 as home network but is staying in cell C2a of the second mobile radio network NW2. Connections of this terminal MS1a to other terminals within the area of the serving second network NW2, as for example to the terminal MS2a, are handled with the second network NW2 being involved alone, connections to terminals within the area of the home network NW1 such as, for example, to the terminal MS1b or to terminals of a third mobile radio network or of a landline network such as, for example, the terminal UE1, are switched via a landline network area called CN for core network in this case.

Figure 2:
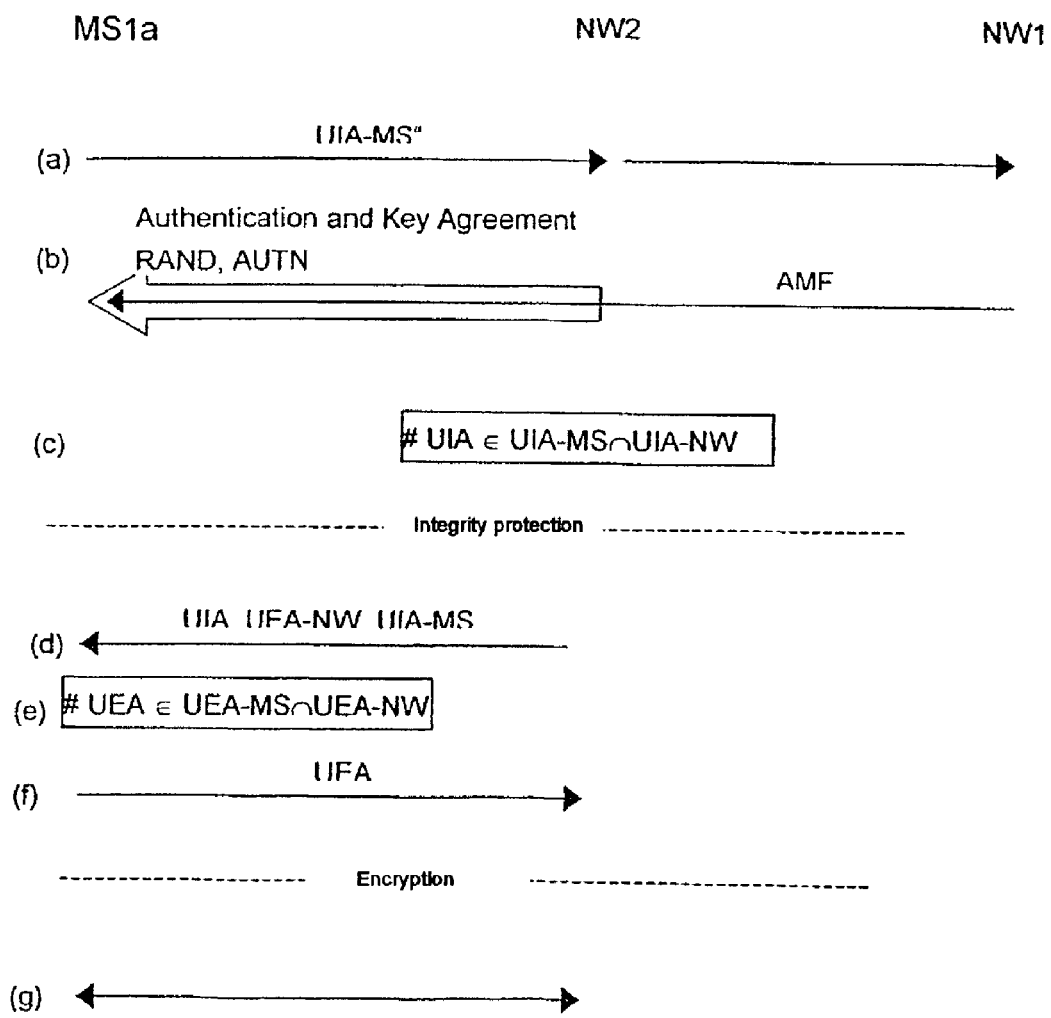
FIG. 2 shows the sequence of a connection set-up between the terminal and the mobile radio network from FIG. 1.

FIG. 2 shows the sequence of the signaling between terminal MS1a and a base station of the serving network NW2 and the home network NW1 when a connection to the terminal MS1a is to be set up. The reason for this can be that the user of the terminal MS1a wishes to establish a connection or that a third party is attempting to reach him. As an example, it is assumed that the networks NW1, NW2 are UMTS networks.

The terminal MS1a begins to set up the connection to the serving mobile radio network NW2 with a message about the set UIA-MS of the integrity protection techniques supported by it (stage a).

The serving mobile radio network NW2 interrogates the home network NW1 of the terminal MS1a for an encryption administration information item which contains information, authorized by the operator of the home network NW1, about whether and possibly which encryption techniques UEA are available in the area of the serving mobile radio network NW2 (stage a). In the case of UMTS, this encryption administration information item is a part of the so-called quintet, and, in particular it is a part of the so-called authentication token (AUTN).

This is followed by a stage b of authentication.

In an authentication, one party in each case sends to the other one an authentication request which contains a number from which the other party calculates a response by means of a predetermined algorithm and a key known only to him. The requesting party compares the received response with an expected value: if the two match, he knows that the other party is really the person he pretends to be.

In UMTS, the network also sends an authentication signal (AUTN) which includes a sequence number SQN, a management field AMF and a message authentication code MAC. This signal allows the network to be authenticated by the terminal. The management field AMF includes the encryption administration information item supplied by the home network NW1. This information item is integrity protected by the message authentication code so that the serving network is not able to change this information item and, therefore, must transmit it transparently (stage b).

Since a wrong base station BS3 which does not belong to the mobile radio network NW2 and which could possibly be used for hijacking attacks on the connection of the terminal MS1a does not obtain such an encryption administration information item AMF from the home network NW1, it is not easily able to present a forged authentication information item AUTN to the terminal MS1a in such a manner that it will be accepted by the terminal MS1a and the latter, therefore, initiates an unencrypted connection.

Instead of an integrity protection, an encryption of the encryption administration information item AMF which does not need to be known to the serving mobile radio network NW2 could also be used by the home network NW1.

However, such a protection is not mandatory. It is also conceivable that the protection against attacks is left in the hands of the user to a certain extent in that, whenever an encryption administration information item AMF received by the terminal MS1a states that an unencrypted connection is necessary, a display on the terminal MS1a draws the user's attention to this. If such a display appears when the terminal MS1a is located in a country in which the possibility for encryption exists, it can be concluded from this that the terminal MS1a is subject to an attack and that it is advisable to abort the connection set-up.

During the authentication procedure, the serving mobile radio network NW2 selects one (UIA) from the set UIA-MS and the set UIA-NW of the integrity protection techniques supported by it and activates it (stage c). A message about the selected integrity protection technique UTA is then transmitted to the terminal MS1a under integrity protection already in existence (stage d). This message also includes the designations of the integrity protection techniques UIA-MS previously reported to the serving mobile radio network NW2 by the terminal MS1a so that the terminal MS1a can find out whether these designations have been correctly received by the serving mobile radio network NW2, and the designations of the encryption techniques UEA-NW supported by the serving mobile radio network NW2.

The terminal MS1a then selects an encryption technique UEA which is supported both by it and by the serving mobile radio network NW2 (stage e) and reports it back to the network NW2 (stage f). From this time on, the encrypted transmission can begin (stage g).

If the encryption administration information item AUTN is genuine and specifies that an unencrypted connection is permitted and the serving network NW2 does not provide any encryption techniques which are also supported by the terminal MS, there are various possibilities of continuing. The first and simplest one is to abort the connection set up under these conditions. Naturally, this very effectively protects the user against fraudulent attacks or against being monitored but, at the same time, it also means that the terminal cannot be used in a country where there is no possibility of encryption. For this reason, this possibility is useful as a first one of at least two operating modes of the terminal and the second operating mode should allow an unencrypted connection to be set up.

Since the first operating mode offers the greatest possible measure of security to the user, however, it is appropriate that the terminal MS1a assumes this operating mode when the user has not expressly selected another one or that it automatically returns into this mode when it has been switched off or when it receives an encryption administration information item AUTN which specifies the possibility of an encryption, for instance because the terminal has returned from the region of a network without encryption capability into a network with encryption capability.

In the second operating mode, the setting up of an unencrypted connection is permitted. A first variant allows an unencrypted connection to be set up without intermediate interruption of the setting-up process. So that the user knows that he is using an unencrypted connection and is thus taking a certain security risk also in this operating mode, the terminal MS1a is provided with a display which advises the user of the operating mode set. This display can be, for example, a flashing of the keypad display panel, or of parts thereof, usually provided in mobile terminals, a luminous element provided especially for this purpose or also a ringing signal which can be varied as a function of the operating mode set.

In a second variation of the second operating mode, in each case, a connection with a serving network without encryption capability is set up if this is expressly authorized by the user. This can be done, for example, in that in the second operating mode, a key of the terminal which is actuated by the user to receive a call or to establish a connection to an opposite party for his part in the first operating mode, causes the display panel of the terminal to display a note that the user is about to establish an unsecure connection, and that the terminal requests a declaration of agreement by the user by again pressing the same key or, even more reliable, of another key, and establishes the connection after such pressing of a key.

Using the method described above, the home network can ensure in a simple and effective manner that its users apply encryption reliably in foreign networks accessible to them due to roaming agreements and offering the possibility of encryption and, at the same time, can also provide them with the freedom of using also the networks of those countries which do not permit encryption.

For the same reasons described above, for which it is advantageous if it is the terminal and not the serving mobile radio network which decides about the encryption technique to be used, it is also appropriate, according to an embodiment of the invention, if the terminal decides the type of integrity protection. The sequence of signaling in this method is shown in FIG. 3. The first stages of the method up to and including the setting up of the integrity protection selected by the serving mobile radio network NW2 is the same as described above with reference to FIG. 2.

The message transmitted to the terminal MS1a in stage d', which includes the encryption techniques UIA-NW supported by the serving mobile radio network NW2, additionally also includes here designations of the integrity protection techniques supported by the serving mobile radio network NW2. After having received this message, the terminal MS1a also selects, in addition to the encryption technique UEA to be used, an integrity protection technique UIA' (stage e') which is supported by the network and the terminal and then sends an instruction to the serving mobile radio network NW2 to use both selections UEA, UIA' in the following procedure (stage f').

This method also provides the terminal with control over the integrity protection technique used during the subsequent communication (stage g) and it is thus possible always to use among the available techniques the one which promises the greatest possible measure of security from the point of view of the user.

The invention claimed is:

1. A method for setting up a connection between a terminal which supports a set of encryption techniques, and a serving mobile radio network, comprising:

transmitting a message from the serving mobile radio network to the terminal, which designates one or more encryption techniques supported by the serving mobile radio network, if any;

transmitting an encryption administration information item from a home network of the terminal to the terminal;

determining whether the encryption administration information item indicates that unencrypted connections to the serving mobile radio network are necessary;

in response to determining that the encryption administration information item indicates that unencrypted connections to the serving mobile radio network are necessary providing the user of the terminal a choice of whether to set up the connection unencrypted or abort the connection attempt; and in response to determining that the encryption administration information item does not indicate that unencrypted connections to the serving mobile radio network are necessary:

the terminal selecting an encryption technique supported by the serving mobile radio network; and operating the connection by using the encryption technique selected by the terminal; and if no encryption technique is supported by the terminal and by the serving mobile radio network, operating the connection unencrypted after authorization.

2. The method as claimed in claim 1, wherein the message during the first transmitting is transmitted with integrity protection.

3. The method as claimed in claim 1, wherein the terminal reports integrity protection techniques supported by the terminal to the serving mobile radio network and the serving mobile radio network selects one among the integrity protection techniques supported by the network and by the terminal and transmits a message about the selected integrity protection technique to the terminal.

4. The method as claimed in claim 3, wherein the message in the first transmitting includes the information about the integrity protection technique selected by the serving mobile radio network.

5. The method as claimed in claim 1, wherein the serving mobile radio network reports integrity protection techniques supported by the network to the terminal and the terminal selects one among the integrity protection techniques supported by the terminal and the serving mobile radio network, the connection being operated under the integrity protection technique selected by the terminal.

6. The method as claimed in claim 5, wherein the message in the first transmitting includes the report of the integrity protection techniques supported by the serving mobile radio network.

7. The method as claimed in claim 1, wherein in the case where the encryption administration information item specifies that an unencrypted connection is necessary, the truth of this statement is checked at the terminal.

8. The method as claimed in claim 1, wherein in the case where the encryption administration information item specifies that an unencrypted connection is necessary, the connection is set up unencrypted.

9. The method as claimed in claim 8, wherein a display of the terminal is operated to inform the user that the connection is unencrypted.

10. The method as claimed in claim 1, wherein in the second transmitting, the encryption administration information item is transmitted to the terminal via the serving network and under integrity protection.

11. The method as claimed in claim 1, wherein in the second transmitting, the encryption administration information item is transmitted to the terminal via the serving network and on an authenticated signaling channel.

12. A terminal which supports a set of encryption techniques technique, comprising a control unit for selecting an encryption techniques which is supported by the terminal and by a serving mobile radio network, wherein the terminal including:
    a hardware communications interface; and
    a display device;
    wherein, the hardware communications interface is configured to receive a message is transmitted from the serving mobile radio network to the terminal, which designates the encryption techniques supported by the serving mobile radio network, if any;
    wherein the hardware communications interface is configured to receive an encryption administration information item transmitted from a home network of the terminal to the terminal, and determine whether the encryption administration information item indicates that unencrypted connections to the serving mobile radio network are necessary;
    wherein in response to determining that the encryption administration information item indicates that unencrypted connections to the serving mobile radio network are necessary, the terminal is configured to display to a user via the display device a choice of whether to set up the connection unencrypted or abort the connection attempt;
    wherein in response to determining that the encryption administration information item does not indicate that unencrypted connections to the serving mobile radio network are necessary, the terminal is configured to select an encryption technique which is supported by the terminal and by the serving mobile radio network, if any, such that the connection is operated by using the encryption technique selected by the terminal; and
    wherein, if no encryption technique is supported by the terminal and by the serving mobile radio network is provided, the terminal is configure to operate the connection unencrypted after authorization.

13. The terminal as claimed in claim 12, wherein the control unit selects an integrity protection technique which is supported by the terminal and by the serving mobile radio network.

14. The terminal as claimed in claim 12, wherein the control unit allows an unencrypted connection between the terminal and the serving mobile radio network when an encryption administration information item specifies that the serving mobile radio network does not support an encryption technique.

15. The terminal as claimed in claim 12, wherein the terminal exhibits an encryption display which indicates to a user whether the serving mobile radio network (NW2) supports an encryption technique.

16. The terminal as claimed in claim 15, wherein the terminal is set up for receiving the encryption administration information item during the setting-up of a connection by the serving mobile radio network.

17. The terminal as claimed in claim 15; wherein that the control unit is switched by a user between at least two of the following operating modes:
    a first operating mode in which a connection is set up with a serving mobile radio network which does not support encryption and an encryption indication is operated in order to inform a user that the connection is unencrypted;
    a second operating mode in which the attempt to set up a connection is aborted if the serving mobile radio network does not support an encryption technique; and
    a third operating mode in which, if the serving mobile radio network does not support an encryption technique, the attempt to set up a connection is interrupted and a user input is requested which determines whether the attempt is to be aborted or to be continued.

18. A mobile radio network configured to follow an instruction by a terminal which designates an encryption technique to be used for a connection between the terminal and the mobile radio network, the mobile radio network including:
    a home network of the terminal; and
    a serving mobile radio network communicatively coupled to the home network;
    wherein, a message is transmitted from the serving mobile radio network to the terminal, which designates the encryption techniques supported by the serving mobile radio network, if any;
    wherein an encryption administration information item is transmitted from the home network of the terminal to the terminal;
    wherein the terminal is configured to determine whether the encryption administration item indicates that unencrypted connections to the serving mobile radio network are necessary;
    wherein in response to determining that the encryption administration information item indicates that unencrypted connections to the serving mobile radio network are necessary, a user of the terminal is provided a choice of whether to set up the connection unencrypted or abort the connection attempt; and
    wherein in response to determining that the encryption administration information item does not indicate that unencrypted connections to the serving mobile radio network are necessary:
    an encryption technique supported by the serving mobile radio network is selected by the terminal; and the connection is operated by using the encryption technique selected by the terminal; and wherein, if no encryption technique is supported by the terminal and by the serving mobile radio network, the connection is operated unencrypted after authorization.

19. The mobile radio network as claimed in claim 18, wherein the network follows an instruction by the terminal, which designates an integrity protection technique to be used for a connection between the terminal and the mobile radio network.

20. The mobile radio network as claimed in claim 18, wherein the network forwards a message that a connection is to be set up between the network and the terminal to a home network of the terminal which differs from the mobile radio network and to forward an encryption administration information item from the home network to the terminal, which includes information about the encryption techniques supported by the mobile radio network.

\* \* \* \* \*

UNITED STATES PATENT AND TRADEMARK OFFICE
CERTIFICATE OF CORRECTION

PATENT NO. : 7,620,183 B2 Page 1 of 1
APPLICATION NO. : 10/296318
DATED : November 17, 2009
INVENTOR(S) : Bart Vinck It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2035 days.

Signed and Sealed this

Twenty-sixth Day of October, 2010

David J. Kappos
*Director of the United States Patent and Trademark Office*